US012801526B2

(12) United States Patent
Zhu

(10) Patent No.: US 12,801,526 B2
(45) Date of Patent: Nov. 17, 2026

(54) METHOD, APPARATUS, AND SYSTEM FOR PROCESSING ACCESS TO OBJECT STORAGE

(71) Applicant: CLOUD INTELLIGENCE ASSETS HOLDING (SINGAPORE) PRIVATE LIMITED, Singapore (SG)

(72) Inventor: Jiaji Zhu, Beijing (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 0 days.

(21) Appl. No.: 18/841,981

(22) PCT Filed: Mar. 1, 2023

(86) PCT No.: PCT/CN2023/078950
§ 371 (c)(1),
(2) Date: Aug. 27, 2024

(87) PCT Pub. No.: WO2023/169269
PCT Pub. Date: Sep. 14, 2023

(65) Prior Publication Data

US 2025/0173267 A1 May 29, 2025

(30) Foreign Application Priority Data

Mar. 11, 2022 (CN) ......................... 202210239000.1

(51) Int. Cl.
*G06F 12/0813* (2016.01)
*G06F 12/02* (2006.01)
*G06F 13/16* (2006.01)

(52) U.S. Cl.
CPC ...... *G06F 12/0813* (2013.01); *G06F 12/0246* (2013.01); *G06F 13/1668* (2013.01)

(58) Field of Classification Search
CPC ............. G06F 12/0813; G06F 12/0246; G06F 13/1668; G06F 3/06; G06F 12/0802
See application file for complete search history.

(56) References Cited

U.S. PATENT DOCUMENTS 10,318,166 B1 6/2019 Tummala et al.
2018/0189185 A1* 7/2018 Peng .................. G06F 12/0868
(Continued)

FOREIGN PATENT DOCUMENTS

CN 104850502 A 8/2015
CN 108776682 A 11/2018
(Continued)

OTHER PUBLICATIONS

International Search Report and Written Opinion dated Apr. 17, 2023 for International Application No. PCT/CN2023/078950.
(Continued)

*Primary Examiner* — Nanci N Wong

(57) ABSTRACT

Embodiments of the present application provide a method, an apparatus, and a system for processing access to object storage, where the method includes: establishing, by a user host, a first mapping relationship between first attribute information and second attribute information in advance; in response to reception of a first data read request, determining a data management unit corresponding to an object to be read by the first data read request according to the first mapping relationship; determining a logical block address of the data management unit; and accessing the server-side cache or the local cache of the user host to acquire data of the logical block address based on an access protocol of block storage and the logical block address.

19 Claims, 9 Drawing Sheets

(56) References Cited

U.S. PATENT DOCUMENTS

| | | | | |
|---|---|---|---|---|
| 2019/0129975 | A1* | 5/2019 | Laier | G06F 3/06 |
| 2019/0146682 | A1* | 5/2019 | Subramanian | G06F 3/0659 711/103 |
| 2022/0050615 | A1* | 2/2022 | Teranishi | G06F 3/061 |
| 2022/0374431 | A1* | 11/2022 | Kavali | G06F 16/2471 |
| 2023/0068214 | A1* | 3/2023 | Inglis | G06F 3/0635 |

FOREIGN PATENT DOCUMENTS

| | | | | | |
|---|---|---|---|---|---|
| CN | 111143305 | A | | 5/2020 | |
| CN | 111143417 | | * | 5/2020 | G06F 16/24552 |
| CN | 111143417 | A | | 5/2020 | |
| CN | 113227994 | A | | 8/2021 | |
| CN | 114327302 | A | | 4/2022 | |

OTHER PUBLICATIONS

The First Office Action dated Apr. 27, 2022 for Chinese Application No. 202210239000.1.

The Second Office Action dated May 27, 2022 for Chinese Application No. 202210239000.1.

Lukas Rupprecht et al. "SwiftAnalytics: Optimizing Object Storage for Big Data Analytics," 2017 IEEE Internation AI Conference on Cloud Engineering (IC2E 2017), Jul. 10, 2017.

Notification of Registration dated Jun. 27, 2022 for Chinese Application No. 202210239000.1.

Tu Xue-zhen et al. "A Mass Small File Storage Optimization Scheme Based on Object File System," Computer Technology and Development, Aug. 2019, vol. 29 No.8.

* cited by examiner

METHOD, APPARATUS, AND SYSTEM FOR PROCESSING ACCESS TO OBJECT STORAGE

CROSS-REFERENCE TO RELATED APPLICATIONS

This application is a National Stage of International Application No. PCT/CN2023/078950, filed on Mar. 1, 2023, which claims priority to Chinese Patent Application No. 202210239000.1, filed to China National Intellectual Property Administration on Mar. 11, 2022 and entitled "METHOD, APPARATUS, AND SYSTEM FOR PROCESSING ACCESS TO OBJECT STORAGE". The contents of the two applications are hereby incorporated by reference in their entireties.

TECHNICAL FIELD

Embodiments of the present application relate to the field of computer technology, and in particular, to a method, an apparatus, and a system for processing access to object storage.

BACKGROUND

As more and more data is deposited into object storage, object storage-based analysis is becoming more popular. The object storage uses a flat file organization, which makes it easy to access, and therefore, has certain performance advantages. In order to accommodate a large amount of object data, at present, the object storage mainly adopts a distributed architecture, based on a large-capacity HDD (Hard Disk Drive) to store object data. A user need to access object data through an access path with a distributed architecture based on an object storage protocol, and the access speed is slow, which cannot meet requirements of fast access scenarios.

SUMMARY

In view of this, embodiments of the present application provide a method for processing access to object storage. One or more embodiments of the present application simultaneously relate to an apparatus for processing access to object storage, a system for processing access to object storage, a computing device, a computer-readable storage medium, and a computer program to address technical deficiencies existing in the prior art.

According to a first aspect of an embodiment of the present application, a method for processing access to object storage is provided, applied to a user host, and including: establishing a first mapping relationship between first attribute information and second attribute information in advance, where the first attribute information is attribute information of an object in an object storage device, and the second attribute information is attribute information of a data management unit in a host system of the user host, where data of at least one data management unit is stored in a server-side cache and/or a local cache of the user host, and the data of the at least one data management unit is data of a corresponding object; in response to reception of a first data read request, determining a data management unit corresponding to an object to be read by the first data read request according to the first mapping relationship; determining a logical block address of the data management unit; and accessing the server-side cache or the local cache of the user host to acquire data of the logical block address based on an access protocol of block storage and the logical block address.

According to a second aspect of an embodiment of the present application, an apparatus for processing access to object storage is provided, configured on a user host and including: a mapping module, configured to establish a first mapping relationship between first attribute information and second attribute information in advance, where the first attribute information is attribute information of an object in an object storage device, and the second attribute information is attribute information of a data management unit in a host system of the user host, where data of at least one data management unit is stored in a server-side cache and/or a local cache of the user host, and the data of the at least one data management unit is data of a corresponding object; a first read response module, configured to, in response to reception of a first data read request, determine a data management unit corresponding to an object to be read by the first data read request according to the first mapping relationship; an address determination module, configured to determine a logical block address of the data management unit; and a first read module, configured to access the server-side cache or the local cache of the user host to acquire data of the logical block address based on an access protocol of block storage and the logical block address.

According to a third aspect of an embodiment of the present application, a method for processing access to object storage is provided, applied to a server-side, and including: in response to reception of a second data read request based on an access protocol of a block storage from a user host, determining a logical block address of data to be read according to the second data read request; where the second data read request is a request issued by the user host by, in response to reception of a first data read request, determining a data management unit corresponding to an object to be read by the first data read request according to a first mapping relationship, and determining a logical block address of the data management unit; where the first mapping relationship is a mapping relationship between first attribute information and second attribute information, the first attribute information is attribute information of an object in an object storage device, and the second attribute information is attribute information of a data management unit in a host system of the user host, where data of at least one data management unit is stored in a server-side cache, and the data of the at least one data management unit is data of a corresponding object; reading data of the logical block address from the server-side cache by using the logical block address; and returning the data to the user host.

According to a fourth aspect of an embodiment of the present application, an apparatus for processing access to object storage is provided, configured on a server-side and including: a second read response module, configured to, in response to reception of a second data read request based on an access protocol of a block storage from a user host, determine a logical block address of data to be read according to the second data read request; where the second data read request is a request issued by the user host by, in response to reception of a first data read request, determining a data management unit corresponding to an object to be read by the first data read request according to a first mapping relationship, and determining a logical block address of the data management unit; where the first mapping relationship is a mapping relationship between first attribute information and second attribute information, the first attribute information is attribute information of an object in an object storage device, and the second attribute information is attribute information of a data management unit in a host system of the user host, where data of at least one data management unit is stored in a server-side cache, and the data of the at least one data management unit is data of a corresponding object; a second read module, configured to read data of the logical block address from the server-side cache by using the logical block address; and a data return module, configured to return the data to the user host.

According to a fifth aspect of an embodiment of the present application, a system for processing access to object storage is provided, including: a user host, configured to establish a first mapping relationship between first attribute information and second attribute information in advance, where the first attribute information is attribute information of an object in an object storage device, and the second attribute information is attribute information of a data management unit in a host system of the user host, where data of at least one data management unit is stored in a server-side cache or stored in the server-side cache and a local cache of the user host, and the data of the at least one data management unit is data of a corresponding object; in response to reception of a first data read request, determine a data management unit corresponding to an object to be read by the first data read request according to the first mapping relationship; determine a logical block address of the data management unit; and access the server-side cache or the local cache of the user host to acquire data of the logical block address based on an access protocol of block storage and the logical block address; a server-side, configured to, in response to reception of a second data read request based on an access protocol of a block storage from the user host, determine a logical block address of data to be read according to the second data read request, read data of the logical block address from the server-side cache by using the logical block address, return the data to the user host; acquire corresponding data from the object storage device if the data of the logical block address does not exist in the server-side cache; and the object storage device, configured to store data of an object.

According to a sixth aspect of an embodiment of the present application, a computing device is provided, including: a memory and a processor; where the memory is configured to store computer executable instructions, and the processor is configured to execute the computer executable instructions, when the computer executable instructions are executed by the processor, the steps of the method for processing access to the object storage are implemented.

According to a seventh aspect of an embodiment of the present application, a computer-readable storage medium is provided, which stores computer executable instructions, when the instructions are executed by a processor, the steps of the method for processing access to the object storage are implemented.

According to an eighth aspect of an embodiment of the present application, a computer program is provided, when the computer program is executed in a computer, the computer is caused to execute the steps of the method for processing access to the object storage.

An embodiment of one side of the present application realizes a method for processing access to object storage, which is applied to a user host, because the method establishes a first mapping relationship between first attribute information and second attribute information in advance, where the first attribute information is attribute information of an object in an object storage device, and the second attribute information is attribute information of a data management unit in a host system of the user host, where data of at least one data management unit is stored in a server-side cache and/or a local cache of the user host, and the data of the at least one data management unit is data of a corresponding object, so that the mapping of the object data to the block storage is realized. Thus, when the user host receives a first data read request for the object data, it can determine a data management unit corresponding to an object to be read by the first data read request according to the first mapping relationship, and determine a logical block address of the data management unit. Then, in a case that the user host can acquire corresponding data from the server-side cache or the local cache of the user host based on the an access protocol of block storage, time consumption caused by an access path with a distributed architecture of the object storage is avoided, and conversion cost of a data access protocol of the object storage is avoided. Efficient access performance of the local cache of the user host and/or the server-side cache, and block storage protocol is exploited to accelerate access of the data of the object storage, and a feature that cost of the object storage is low and data access is convenient is combined to better meet access requirements.

An embodiment of the other side of the present application realizes a method for processing access to object storage, which is applied to a server-side, because the server-side in the method, in response to reception of a second data read request based on an access protocol of a block storage from a user host, determines a logical block address of data to be read according to the second data read request. The second data read request is a request issued by the user host by, in response to reception of a first data read request, determining a data management unit corresponding to an object to be read by the first data read request according to a first mapping relationship, and determining a logical block address of the data management unit. The first mapping relationship is a mapping relationship between first attribute information and second attribute information, the first attribute information is attribute information of an object in an object storage device, and the second attribute information is attribute information of a data management unit in a host system of the user host, where data of at least one data management unit is stored in a server-side cache, and the data of the at least one data management unit is data of a corresponding object, so that mapping of object storage data to block storage is realized. Thus, in a case that the server-side can use the logical block address to read data of the logical block address from the server-side cache, it can return the data to the user host, time consumption caused by an access path with a distributed architecture of the object storage by a user is avoided, and conversion cost of a data access protocol of the object storage is avoided. Efficient access performance of the server-side cache and block storage protocol is exploited to accelerate access of the data of the object storage, and a feature that cost of the object storage is low and data access is convenient is combined to better meet access requirements.

DESCRIPTION OF EMBODIMENTS

Figure 1:
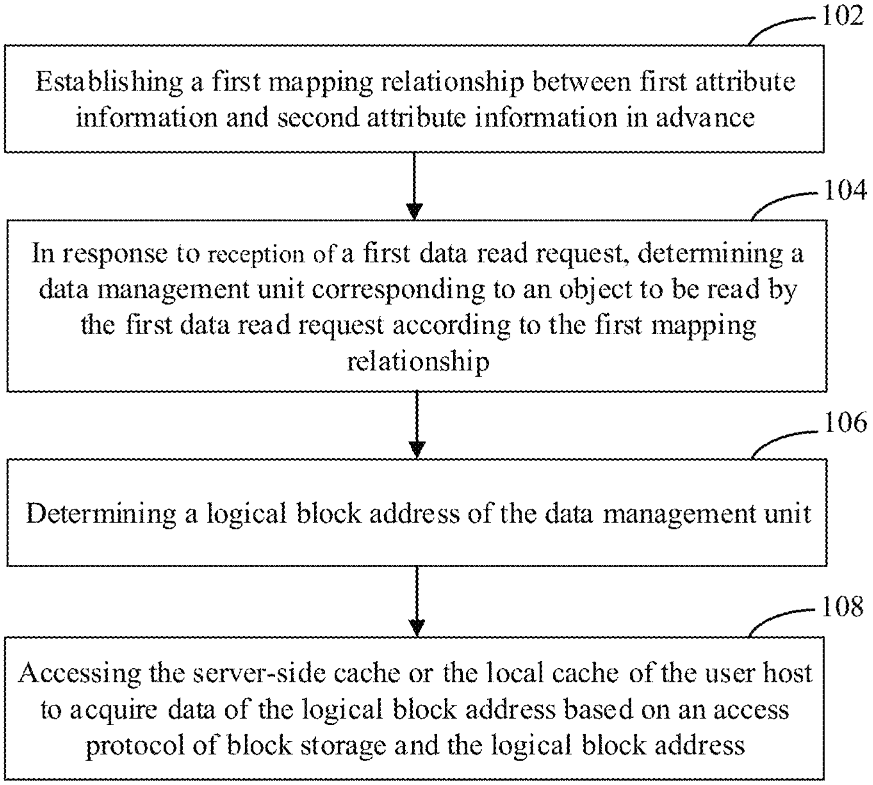
FIG. 1 is a flow diagram of a method for processing access to object storage applied to a user host provided by an embodiment of the present application.

Many specific details are given in the following description to facilitate a full understanding of the present application. However, the present application may be implemented in many ways different from those described herein, and persons skilled in the art may do similar promotion without violating the intension of the present application, and therefore the present application is not subject to the specific implementation disclosed below.

Terms used in one or more embodiments of the present application are used solely for the purpose of describing specific embodiments and are not intended to limit one or more embodiments of the present application. The terms “a”, “said” and “the” in the singular form as used in one or more embodiments of the present application and the accompanying claims are also intended to include the majority form, unless the context clearly indicates otherwise. It should also be understood that the term “and/or” as used in one or more embodiments of the present application refers to and encompasses any or all possible combinations of one or more related listed items.

It should be understood that although the terms first and second classes may be used to describe various information in one or more embodiments of the present application, such information should not be limited to these terms. These terms are used only to distinguish the same type of information from one another. For example, without departing from the scope of one or more embodiments of the present application, the first may also be referred to as the second, and likewise the second may be referred to as the first. Depending on the context, the word “if” as used here can be interpreted as “at time of . . . ” or “when . . . ” or “in response to determination of”.

First, noun terms involved in one or more embodiments of the present application is explained.

- Object storage: is a massive, secure, low-cost, and highly reliable cloud storage service, suitable for storing any type of files. Capacity and processing power expand flexibly, multiple storage types are available, and storage costs are fully optimized.
- Logical block device: a device in a system that can access fixed size pieces of data (chunks) at random (no need to order) is called a block device, and these pieces of data are called a block. The most common is a hard disk. A logical block device is a virtual device that emulates a block device.
- LBA: Logical Block Address (LBA) is a general mechanism for describing a block of data on a computer storage device, usually used in an auxiliary memory device such as a hard disk. LBA can refer to an address of a block of data or a block of data to which an address refers. For example, a logical block on a computer is usually a 512 or 1024 bit group. A standard in ISO-9660 format has 2048 bit groups as a logical block size.
- Local file system: a file system allows applications to store and retrieve files, files are placed in a hierarchical structure, the file system specifies a naming convention for the files and a format of a file path in a tree structure.

In the present application, a method for processing access to object storage is provided, and an apparatus for processing access to object storage, a computing device, and a computer readable storage medium are also involved, which are described in detail in the following embodiments.

Refer to FIG. 1, FIG. 1 shows a flow diagram of a method for processing access to object storage applied to a user host provided by an embodiment of the present application, including the following steps specifically.

Step 102: establishing a first mapping relationship between first attribute information and second attribute information in advance.

The first attribute information is attribute information of an object in an object storage device, and the second attribute information is attribute information of a data management unit in a host system of the user host, where data of at least one data management unit is stored in a server-side cache and/or a local cache of the user host, and the data of the at least one data management unit is data of a corresponding object.

For example, the first attribute information can be any one or more pieces of attribute information in metadata information of an object in the object storage device, and the second attribute information can be any one or more pieces of attribute information in metadata information of the data management unit in the host system of the user host. Metadata information is data that describes data, describes data attributes, and supports data processing.

For example, the first attribute information can include but is not limited to attribute information such as bucket, object name and object data scale. The second attribute information, for example, may include but is not limited to attribute information such as data management unit name, creation time, data scale of the data management unit, etc.

The data management unit may be the smallest unit for managing data in the host system of the user host. For example, in a local file system, the data management unit can be a file. It is understood that in the user host on which a logical block device is mounted, each data management unit has a corresponding logical block address in the logical block device. In an initial state, the data management unit can not be filled with data of an object, and only be allocated with mapping space to do mapping on the relationship. As the user reads the object data, the data management unit can be filled with data of a corresponding object when the data is placed in a cache. Therefore, the local cache of the user host can be used to store the data of the object of the logical block device to accelerate access.

Figure 2:
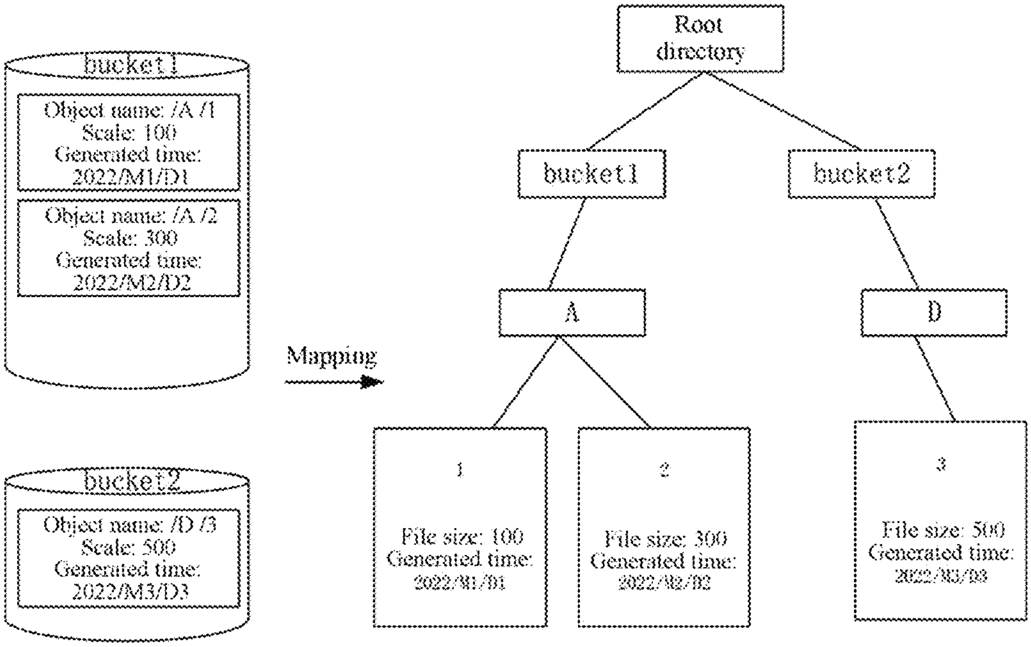
FIG. 2 is a diagram of a first mapping relationship provided by an embodiment of the present application.

The first mapping relationship can be a one-to-one mapping relationship between the object and the data management unit. For example, in the host system, the data management unit can be a hierarchical organization structure. Therefore, it can be mapped according to a directory hierarchy relationship contained in the object attribute information. Specifically, as shown in FIG. 2, in a case that the host system of the user host is the local file system, the data management unit can be understood as a file, so that the attribute information of the object in the object storage device is mapped to attribute information of the file according to a directory hierarchy to acquire a set of the first mapping relationship. Specifically, the attribute information of the object includes bucket information, object name prefix information, object name suffix information, creation time information, and object data scale information. During the mapping, the bucket information can be mapped to a first-layer folder under a root directory of the file system; the object name prefix information can be mapped to a folder next to the folder where the bucket resides; the object name suffix information can be mapped as a file name, the rest information of the creation time information and the object data scale information can be mapped as a basic attribute of the file, such as file creation time and file size.

The server-side and the user host can communicate based on an access protocol of block storage. Specifically, for example, the logical block device can be established in advance, and after the host system of the user host is formatted, the logical block device is mounted to the user host. In this way, the server-side of the logical block device can communicate with the user host mounted to the logical block device based on the access protocol of the block storage. The user host can be any type of computer used by the user. The host system may be any possible data management system, such as the local file system. To ensure data security, the logical block device can be mounted to the user host in read-only mode to prevent object data from being tampered.

The cache of the server-side can be used to store the data of the object of the logical block device to accelerate access. When it need to read data from the cache, data can be read from the server-side cache based on the logical block address of the data. The server-side may include, but is not limited to, various functional components such as cache, instance, mirror, block storage, snapshot, and security as required. The user host can perform data access for the cache of the server-side with the specified logical block address based on the access protocol of the block storage.

Step 104: in response to reception of a first data read request, determining a data management unit corresponding to an object to be read by the first data read request according to the first mapping relationship.

The first data read request can be understood as a user's request to read data of any one or more objects in the object storage. For example, if the user host receives a data read request for "object A", a corresponding "file A" can be determined based on the first mapping relationship "object A-file A".

Source of the first data read request is not limited, and any user or program subject who has need to access the data of the object in the object storage device can trigger the first data read request.

For example, in some application scenarios, in order to facilitate the user to directly access data by object, the metadata information of the object can be added on a display interface of the host system according to the first mapping relationship for easy access by users. For example, the metadata information of the corresponding object can be added to a location where file metadata information is displayed on the local file system, so that the user can select an object that needs to access. For another example, the file metadata information of the local file system can be directly replace with the metadata information of the corresponding object. The user can select one or more objects on the interface to access. When the user selects any one or more objects for access, it is equivalent to issuing the first data read request.

For example, in some other application scenarios, where a user program analyzes the object data, the access to the object data is a process within the user program, so there is no need to display the metadata information of the object on the interface of the host system. The user program can directly issue the first data read request to any one or more objects.

Step 106: determining a logical block address of the data management unit.

For example, several pieces of attribute information of the data management unit can include the corresponding logical block address. In a case that the data management unit is determined, the logical block address can be acquired from its attribute information.

For example, in conjunction with the preceding example, the user host can find a logical block address of the "file B" in the logical block device in the attribute information of the "file B".

Step 108: accessing the server-side cache or the local cache of the user host to acquire data of the logical block address based on an access protocol of block storage and the logical block address.

It can be understood that a message transfer between the user host and the server-side is based on the access protocol of block storage. The access protocol of the block storage is a protocol that agrees on a message format of a message used to transmit the data block. A message format of a message generated based on the access protocol of the block storage is based on a binary description. The message format is more compact, resolution is faster, and transmission performance is higher.

There is no limit to a specific implementation of the server-side cache and the local cache of the user host. For example, the server-side cache can be a cache area of the logical block device mounted to the user host on the server-side. For another example, the local cache of the user host can be a cache area of the data management system. For example, in a case that the user host system is the local file system, the cache of the user host can be understood as a page cache used by the local file system. For example, when a linux system reads and writes files, logical contents of the file are cached through page cache to accelerate access to images and data on the disk.

In this method, the user host establishes a first mapping relationship between first attribute information and second attribute information in advance, where the first attribute information is attribute information of an object in an object storage device, and the second attribute information is attribute information of a data management unit in a host system of the user host, where data of at least one data management unit is stored in a server-side cache and/or a local cache of the user host, and the data of the at least one data management unit is data of a corresponding object, so that the mapping of the object data to the block storage is realized. Thus, when the user host receives a first data read request for the object data, it can determine a data management unit corresponding to an object to be read by the first data read request according to the first mapping relationship, and determine a logical block address of the data management unit. Then, in a case that the user host can acquire corresponding data from the server-side cache or the local cache of the user host based on the an access protocol of block storage, time consumption caused by an access path with a distributed architecture of the object storage is avoided, and conversion cost of a data access protocol of the object storage is avoided. Efficient access performance of the local cache of the user host and/or the server-side cache, and block storage protocol is exploited to accelerate access of the data of the object storage, and a feature that cost of the object storage is low and data access is convenient is combined to better meet access requirements.

It should be noted that in the method for processing access to object storage applied to the user host provided by the embodiment of the present application, the user host can cooperate with the server-side and the object storage device to achieve access to the object data, or the user host can also use the local cache of the user host to cooperate with the object storage device to achieve access to the object data without the cooperation of the server-side, as explained one by one below.

For example, in an embodiment of the user host cooperating with the server-side and the object storage device to achieve access to the object data, the accessing the server-side cache or the local cache of the user host to acquire the data of the logical block address based on the access protocol of the block storage and the logical block address may include: accessing the local cache of the user host to acquire the data of the logical block address based on the access protocol of the block storage and the logical block address; if the data of the logical block address is not acquired from the local cache of the user host, accessing the server-side cache to acquire the data of the logical block address.

Figure 3:
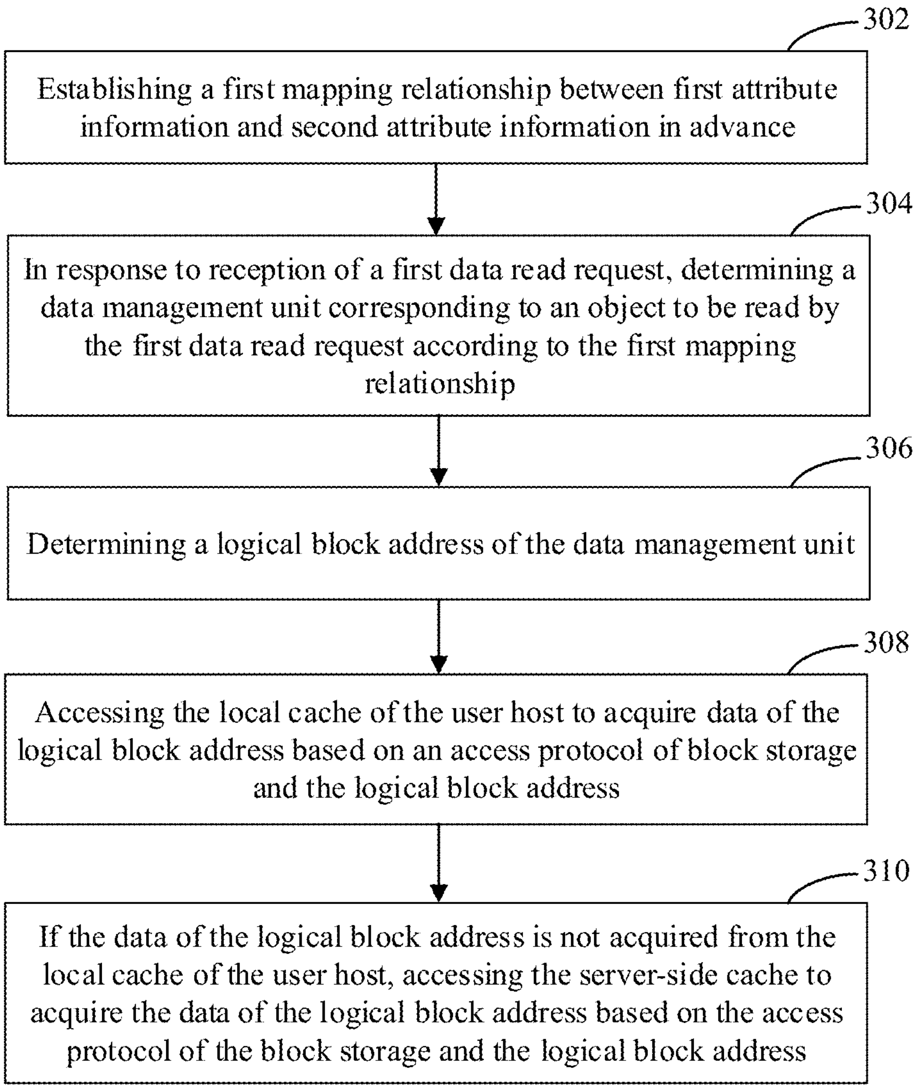
FIG. 3 is a process diagram of a method for processing access to object storage provided by another embodiment of the present application.

Specifically, see FIG. 3, FIG. 3 shows a process diagram of a method for processing access to object storage provided by another embodiment of the present application, including the following steps specifically.

Step 302: establishing a first mapping relationship between first attribute information and second attribute information in advance.

Step 304: in response to reception of a first data read request, determining a data management unit corresponding to an object to be read by the first data read request according to the first mapping relationship.

Step 306: determining a logical block address of the data management unit.

Step 308: accessing the local cache of the user host to acquire data of the logical block address based on an access protocol of block storage and the logical block address.

Step 310: if the data of the logical block address is not acquired from the local cache of the user host, accessing the server-side cache to acquire the data of the logical block address based on the access protocol of the block storage and the logical block address.

As can be seen from the above processing flow, in this embodiment, when receiving the data read request for an object in the object storage device, the data is first read from the local cache of the user host based on the access protocol of the block storage through a mapping between the object and the data management unit. If the data does not exist in the local cache, then the data is acquired from the server-side cache based on the access protocol of the block storage. Thus, when there is data of the object to be read in local, there is no need to send an access request through the network, and data access is accelerated.

In addition, in order to improve data read efficiency, in conjunction with the above embodiment, the method may also include: placing the data acquired from the server-side cache into the local cache of the user host.

In the above embodiment, the data read from the server-side cache is placed into the local cache of the user host, so that when it needs to read the data again, the data can be read directly from the local cache, the access request is avoided from being sent through the network, and the data access is accelerated.

It should be noted that the data in the local cache of the user host is not limited to data acquired from the server-side, but can be acquired from any location. For example, the data in the local cache of the user host may be acquired from the server-side cache or from the object storage, which is not limited in the method provided in the embodiment of the present application. As long as the data in the local cache is the data of the object to be accessed by the user, it can be read from the local cache and returned to the user.

Thus, in one or more embodiments of the present application, the accessing the server-side cache or the local cache of the user host to acquire the data of the logical block address based on the access protocol of the block storage and the logical block address may include: accessing the local cache of the user host to acquire the data of the logical block address based on the access protocol of the block storage and the logical block address. Accordingly, the method may also include: if the data of the logical block address is not acquired from the local cache of the user host, issuing access to the object storage device to acquire data of the object to be read by the first data read request; and placing the acquired data into the local cache of the user host.

Figure 4:
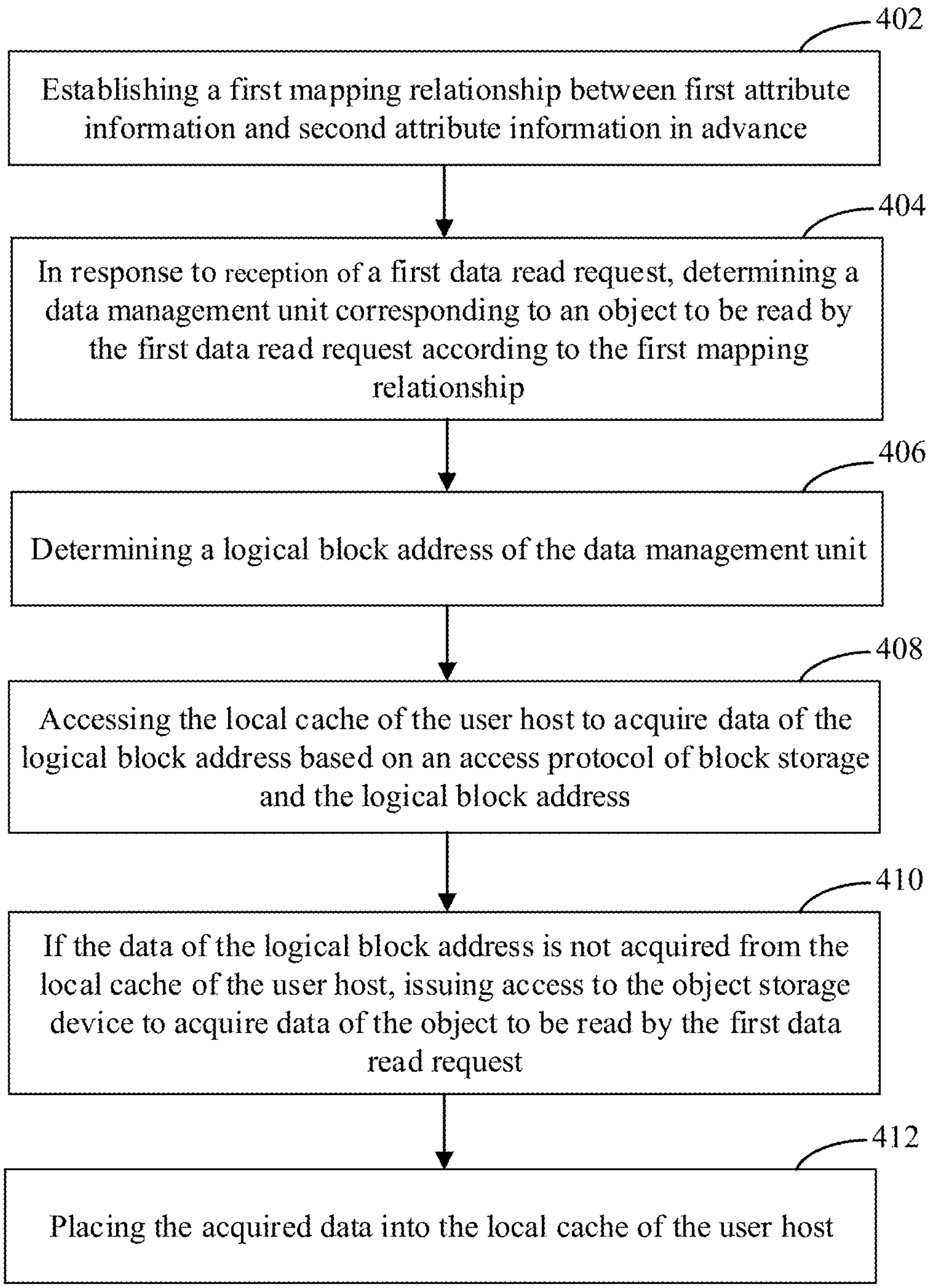
FIG. 4 is a process diagram of a method for processing access to object storage provided by yet another embodiment of the present application.

In combination with the above embodiment, refer to FIG. 4, FIG. 4 shows a process diagram of a method for processing access to object storage provided by yet another embodiment of the present application, including the following steps specifically.

Step 402: establishing a first mapping relationship between first attribute information and second attribute information in advance.

Where data of at least one data management unit is stored in a local cache of the user host, and the data of the at least one data management unit is data of a corresponding object Step 404: in response to reception of a first data read request, determining a data management unit corresponding to an object to be read by the first data read request according to the first mapping relationship.

Step 406: determining a logical block address of the data management unit.

Step 408: accessing the local cache of the user host to acquire data of the logical block address based on an access protocol of block storage and the logical block address.

Step 410: if the data of the logical block address is not acquired from the local cache of the user host, issuing access to the object storage device to acquire data of the object to be read by the first data read request.

Step 412: placing the acquired data into the local cache of the user host.

For example, the method provided in the above embodiment can be implemented using a local file system of the user host. Specifically, in the above embodiment, the host system of the user host may be a local file system, and the data management unit may be a file. Object-to-file mapping is implemented by mapping metadata information of the object to the file metadata information of the local file system on the user host. When the user wants to access the object, a file can be read from the local cache of the user host based on the mapping to acquire object data. If the data does not exist in the local cache, the object data access request can be sent to the object storage device, and the object data is returned to the file system for caching, so as to return the data to the user.

In the above embodiment, based on mapping of the object to the data management unit in the user host, the local cache of the user host can be directly used to accelerate the access to the object data without cooperation of the server-side. In a case that the user host can acquire the corresponding data from the local cache, time consumption caused by an access path of a distributed object storage is avoided, and conversion cost of the data access protocol of the object storage is avoided, access performance advantage of the local cache and the access protocol based on a block storage in the host system can be used to accelerate the access to object storage data, and a feature that cost of the object storage is low and data access is convenient is combined to better meet access requirements.

In one or more embodiments of the present application, considering that the local file system has certain advantages in data access performance, the host system of the user host may be a local file system, and the data management unit may be a file, and accordingly, the establishing the first mapping relationship between the first attribute information and the second attribute information in advance may include: mapping the attribute information of the object in the object storage device to attribute information of the file according to directory hierarchy to acquire a set of the first mapping relationship.

It can be seen from the above embodiment that when one or more objects in the object storage are to be accessed, an access request to the object can be converted into access to the local file system file according to the method provided in the embodiment of the present application, and the data can be accessed directly through an interface of the local file system. On one hand, development difficulty of the method provided in the embodiment of the present application can be reduced. On the other hand, performance advantages of the local file system, such as compact directory/file organization, efficient query, and superior directory/small file operation support and access performance, can be used to further improve the data access performance of the object storage.

Figure 5:
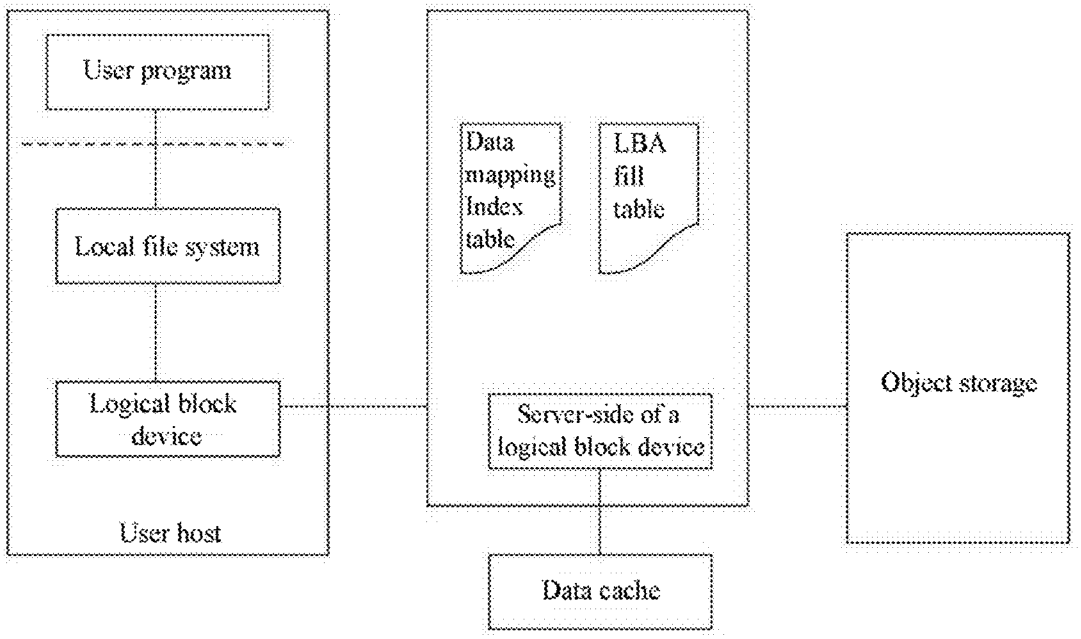
FIG. 5 is a system architecture diagram provided by an embodiment of the present application.

In combination with FIG. 5, a method for processing access to object storage is further explained by taking an application of the method for processing access to object storage in the user host based on the local file system provided by the present application as an example. FIG. 5 shows a system architecture diagram of an embodiment of the present application. As shown in FIG. 5, the user program can send the data access request to the object to the local file system, and the local file system can first read the data of the corresponding file in the local cache based on a message access protocol within the system. If it is read, the data can be directly returned to the user program; if it is not read, a read request of the data of the corresponding file can send to the server-side based on the access protocol of the block storage. The server-side first reads the data of the corresponding file in the server-side cache, and if it is read, it can be directly returned to the user host, and the user host will return the data to the user program; if it is not read, the server-side can further send a read request of the data of the corresponding object to the object storage device based on the access protocol of the object storage. After the server-side acquires the data of the corresponding object, it places the data into the server-side cache, and returns the data to the user host, and the user host returns the data to the user program.

Through the above processing flow, it can be seen that the method embodiment of the system architecture maps the object in the object storage device to the file in the local file system. Through efficient data mapping, the data of the file is the data of the corresponding object, and the metadata access of the file/object is completed on the local file system. Access to data that is not in the cache can be completed by accessing the object storage through lazy load, which gives full play to a performance advantage of the block storage and the local file system, effectively overcomes insufficient performance of data access to object storage, and a feature that cost of the object storage is low and data access is convenient is combined to better meet access requirements. Specifically, the performance advantage is mainly manifested in the following aspects.

On one hand, the local file system has a large amount of file/directory metadata information (inode/dentry) and page cache cached in a host system memory. Therefore, a page cache mechanism of the local file system can be effectively used to acquire the data of the corresponding object from the local cache. In this way, in a case that the data of the file corresponding to the object exists in the local cache, the access request is avoided from being sent through the network, and the access is accelerated.

On the other hand, a directory/file organization mode of the local file system is more compact, and query is more efficient. Each object can be mapped to each file in the local file system according to the directory hierarchy, and then the object to be accessed can be queried by an organization mode of the local file system. In addition, a cache mechanism of the server-side of the logical block device can be effectively used to acquire the data of the corresponding object from the server-side cache. In this way, in a case that the data of the file corresponding to the object exists in the server-side cache, distributed multi-round access through the object storage can be avoided and the access can be accelerated.

On the other hand, data is transmitted between the user host and the server-side based on the access protocol of the block storage, thus a problem of high cost of data access protocol conversion of object storage is avoided.

Figure 6A:
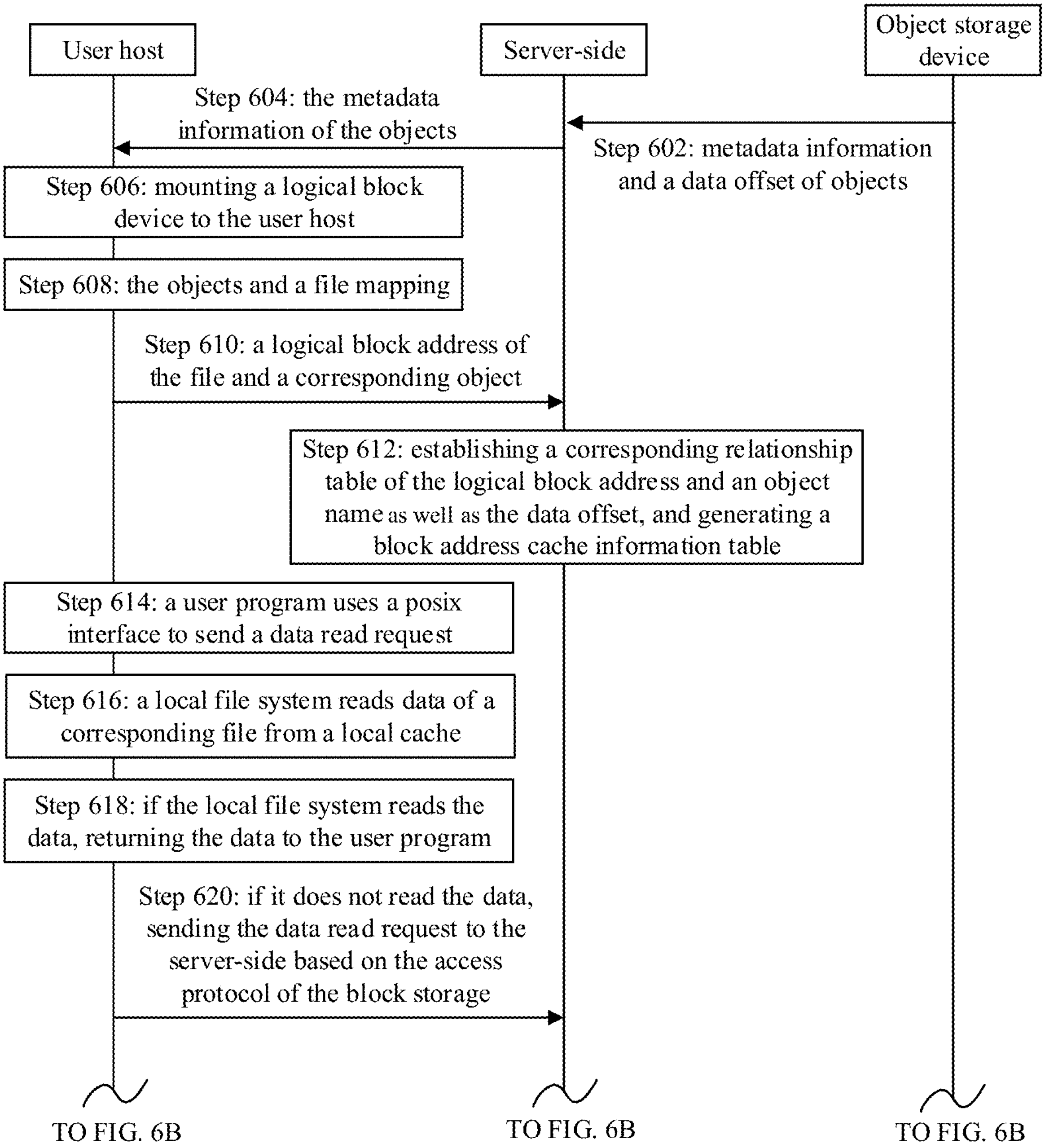
FIGS. 6A and 6B are message interaction diagrams of a method for processing access to object storage provided by an embodiment of the present application.
Figure 6B:
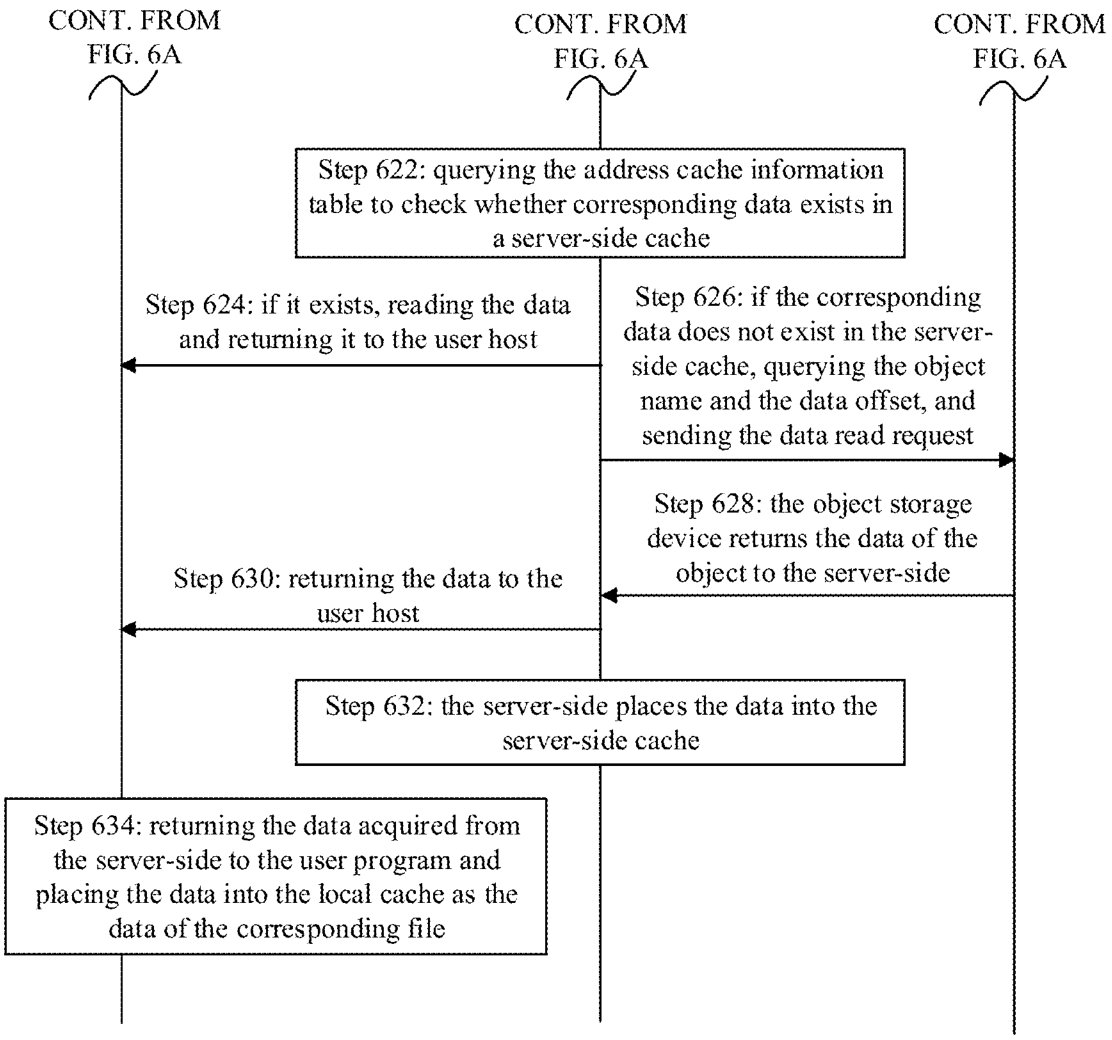

In order to make the method provided in the embodiment of the present application easier to understand, in combination with FIGS. 6A and 6B, a processing flow of the method for processing access to object storage is further explained by taking an application of the method for processing access to object storage in the user host based on a local file system provided by the present application as an example. Refer to FIGS. 6A and 6B, FIGS. 6A and 6B show message interaction diagrams of a method for processing access to object storage provided by an embodiment of the present application, including the following steps specifically.

Step 602: a server-side acquires metadata information and a data offset of all objects in a data lake from the data lake of an object storage device.

The data lake is a type of system or storage that stores data in its natural/original format, usually object blocks or files, including copies of original data generated by the original system and converted data generated for various tasks, and including structured data (rows and columns), semi-structured data (such as CSV, logs, XML, JSON), unstructured data (such as email, documents, PDF, etc.), and binary data (such as images, audio, video) from relational databases. For example, the embodiment can be applied to a data analysis scenario based on a data lake to improve efficiency of data access in the scenario.

Step 604: the server-side sends the metadata information of all objects to a user host.

Step 606: the user host establishes a logical block device, formats the local file system, and mounts the logical block device and the local file system to the user host in read-only mode.

Step 608: the user host maps attribute information of an object in the object storage device to attribute information of the file according to directory hierarchy to acquire a set of a first mapping relationship.

The data can be not filled by default at the initial time, and only a corresponding space is allocated.

Step 610: the server-side acquires a logical block address of all files from the user host and determines an object corresponding to the logical block address.

For example, the server-side can acquire the logical block address and information of an object name corresponding to the logical block address from the user host.

Step 612: the server-side establishes a corresponding relationship table of the logical block address and the object name as well as the data offset, and generates a block address cache information table.

For example, the server-side can generate a data mapping Index table on the server-side of the logical block device based on LBA layout of the file in the local file system of the user host. A key of the data mapping Index table is LBA, and a value is the object name and the data offset. The data offset is the storage address of the object in the object storage device. The server-side generates the address cache information table based on received LBA information, which can also be called a LBA fill table. In the LBA fill table, each LBA has a corresponding cache hit information. If the data of the logical block address exist in a server-side cache, the corresponding cache hit information is 1. If the data of the logical block address does not exist in the server-side cache, the corresponding cache hit information is 0. Therefore, each time the server-side updates the cache, the address cache information table can be updated accordingly.

Step 614: a user program uses a posix interface to send a data read request for one or more objects to the local file system, the user host determines a corresponding file based on a mapping relationship between the metadata information of the object and metadata information of the file.

Step 616: the local file system reads the data of the corresponding file from the local cache.

Step 618: if the local file system reads the data, return the data to the user program.

Step 620: if the local file system does not read the data, the logical block device sends the data read request to the server-side based on the access protocol of the block storage and carries a logical block address of the corresponding file.

Step 622: the server-side queries the address cache information table to check whether corresponding data exists in the server-side cache based on the logical block address carried in the received data read request.

Step 624: if the corresponding data exists, the server-side reads the data from the cache and returns it to the user host.

Step 626: if the corresponding data not exists, the server-side queries a corresponding relationship table between the logical block address and the object name as well as the data offset to determine an object name and data offset of an object to be accessed, and sends the data read request to the object storage device based on the object storage protocol and carries the object name and data offset information.

Step 628: the object storage device returns the data of the object to the server-side.

Step 630: the server-side returns the data to the user host.

Step 632: the server-side places the data into the server-side cache.

Step 634: the user host returns the data acquired from the server-side to the user program and places the data into the local cache as the data of the corresponding file, so that the user program can reuse the data when it reads the next time.

The preceding process shows that when the user program reads data for data analysis, it can directly read the local file system using the posix interface. Based on the mapping relationship between metadata information, the local file system can interpret a request as an LBA read request of a logical disk and read data from the local cache. If the data does not exist in the local cache, the user host sends an LBA read request to the server-side to request data. The server-side first queries the address cache information table known as the LBA fill table. If cache hit information corresponding to requested LBA is 1, it indicates that data requested to be read may be cached object data, data of corresponding address of the logical block device cache disk is directly read and returned to the user host. If the cache hit information corresponding to the requested LBA is 0, the data requested to be read still exists on the object storage device, object name+data offset can be queried by using the data mapping Index table, the corresponding object is accessed to acquire data and the data is returned to the user host. At the same time, the server-side writes the data to a cache disk of the logical block device as the page cache, and updates the cache hit information corresponding to the LBA to 1. Therefore, the embodiment uses efficient data mapping to complete access to object on a local file system, and actual data access is completed through lazy load object storage, which gives full play to the performance advantages of block storage and a local file system, and combines features that cost of the object storage is low and data access is convenient to better meet analysis requirements of the data lake.

Figure 7:
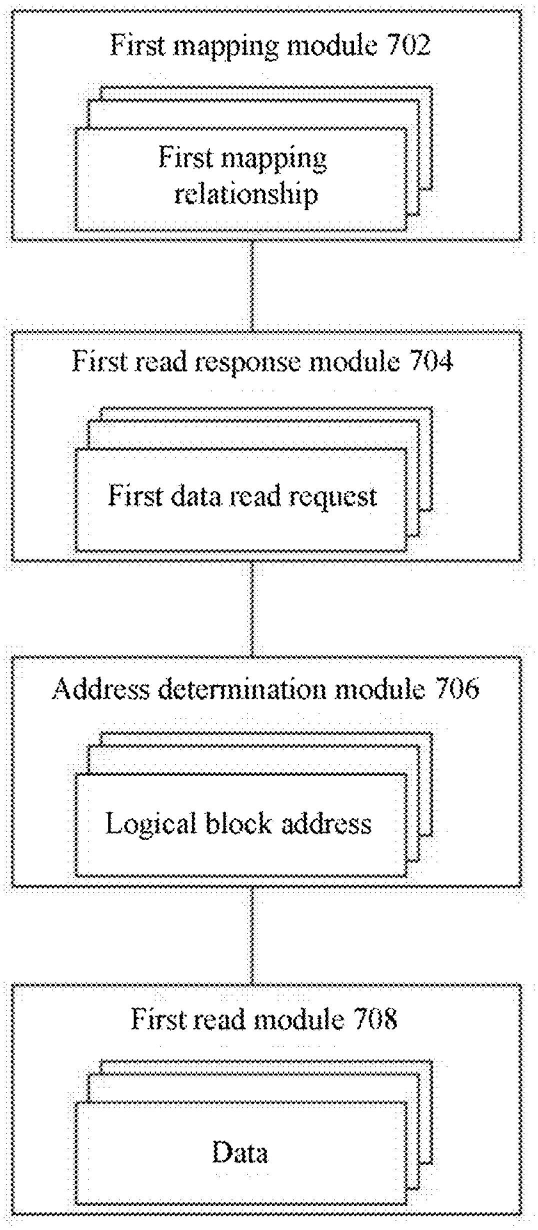
FIG. 7 is a structural diagram of an apparatus for processing access to object storage configured on a user host provided by an embodiment of the present application.

Corresponding to the above method embodiment, the present application also provides an embodiment of an apparatus for processing access to object storage configured on a user host. FIG. 7 shows a structural diagram of an apparatus for processing access to object storage configured on a user host provided by an embodiment of the present application. As shown in FIG. 7, the apparatus includes:

a first mapping module 702, which can be configured to establish a first mapping relationship between first attribute information and second attribute information in advance, where the first attribute information is attribute information of an object in an object storage device, and the second attribute information is attribute information of a data management unit in a host system of the user host, where data of at least one data management unit is stored in a server-side cache and/or a local cache of the user host, and the data of the at least one data management unit is data of a corresponding object;

- a first read response module 704, which can be configured to, in response to reception of a first data read request, determine a data management unit corresponding to an object to be read by the first data read request according to the first mapping relationship;
- an address determination module 706, which can be configured to determine a logical block address of the data management unit; and
- a first read module 708, which can be configured to access the server-side cache or the local cache of the user host to acquire data of the logical block address based on an access protocol of block storage and the logical block address.

In the apparatus, the user host establishes a first mapping relationship between first attribute information and second attribute information in advance, where the first attribute information is attribute information of an object in an object storage device, and the second attribute information is attribute information of a data management unit in a host system of the user host, where data of at least one data management unit is stored in a server-side cache and/or a local cache of the user host, and the data of the at least one data management unit is data of a corresponding object, so that the mapping of the object data to the block storage is realized. Thus, when the user host receives a first data read request for the object data, it can determine a data management unit corresponding to an object to be read by the first data read request according to the first mapping relationship, and determine a logical block address of the data management unit. Then, in a case that the user host can acquire corresponding data from the server-side cache or the local cache of the user host based on the an access protocol of block storage, time consumption caused by an access path with a distributed architecture of the object storage is avoided, and conversion cost of a data access protocol of the object storage is avoided. Efficient access performance of the local cache of the user host and/or the server-side cache, and block storage protocol is exploited to accelerate access of the data of the object storage, and a feature that cost of the object storage is low and data access is convenient is combined to better meet access requirements.

In one or more embodiments of the present application, the host system of the user host is a local file system, and the data management unit is a file. Accordingly, the first mapping module 702 can be configured to map the attribute information of the object in the object storage device to attribute information of the file according to directory hierarchy to acquire a set of the first mapping relationship.

In one or more embodiments of the present application, the first read module 708 can include: a local cache read sub-module, which can be configured to access the local cache of the user host to acquire the data of the logical block address based on the access protocol of the block storage and the logical block address; and a server-side cache read sub-module, which can be configured to, if the data of the logical block address is not acquired from the local cache of the user host, access the server-side cache to acquire the data of the logical block address based on the access protocol of the block storage and the logical block address.

According to the above embodiment, when receiving the data read request for the object in the object storage device, the data is first read from the local cache of the user host based on the access protocol of the block storage through a mapping between the object and the data management unit. If the local cache does not have the data, then the data is acquired from the server-side cache based on the access protocol of the block storage. Thus, when there is data of the object to be read in local, there is no need to send an access request through the network, data access is accelerated.

In addition, in order to improve data read efficiency, the apparatus may also include: a local cache update module, which can be configured to place the data acquired from the server-side cache into the local cache of the user host.

In further one or more embodiments of the present application, the first read module 708 can include: a local cache read sub-module, which can be configured to access the local cache of the user host to acquire the data of the logical block address based on the access protocol of the block storage and the logical block address.

Accordingly, the apparatus may also include: an object storage access module 710, which can be configured to, if the data of the logical block address is not acquired from the local cache of the user host, issue access to the object storage device to acquire data of the object to be read by the first data read request. The local cache update module can be configured to place the acquired data into the local cache of the user host. In this embodiment, based on mapping of the object to the data management unit in the user host, the local cache of the user host can be directly used to accelerate the access to the object data without cooperation of the server-side. In a case that the user host can acquire the corresponding data from the local cache, time consumption caused by an access path of a distributed object storage is avoided, and conversion cost of the data access protocol of the object storage is avoided, access performance advantage of the local cache and the access protocol based on a block storage in the host system can be used to accelerate the access to object storage data, and a feature that cost of the object storage is low and data access is convenient is combined to better meet access requirements.

The above is an illustrative solution of an apparatus for processing access to object storage configured on a user host in the present embodiment. It should be noted that the technical scheme of the apparatus for processing access to object storage configured on the user host belongs to the same idea as the above technical scheme of the method for processing access to object storage applied to the user host. For details not described in the technical scheme of the apparatus for processing access to object storage configured on the user host, see the description of the technical scheme of the method for processing access to object storage applied to the user host.

Figure 8:
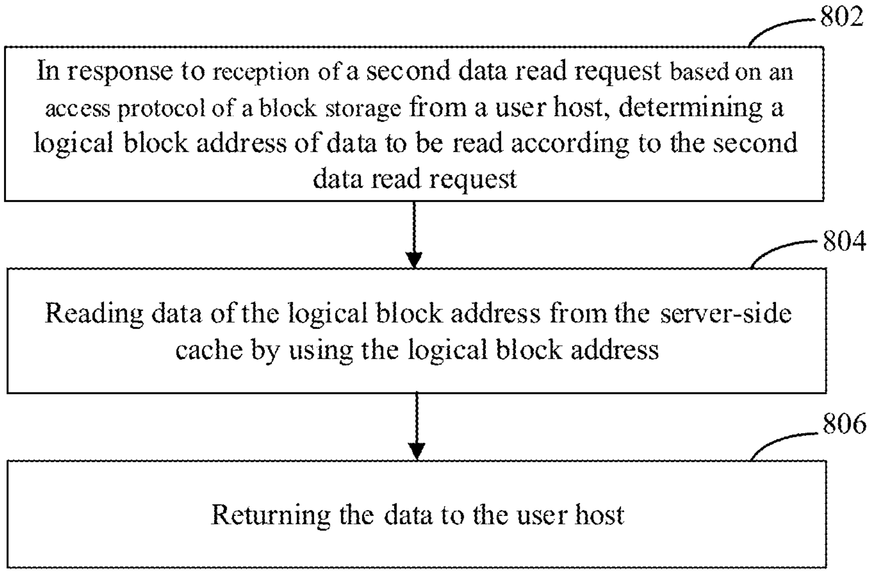
FIG. 8 is a flow diagram of a method for processing access to object storage applied to a server-side provided by an embodiment of the present application.

Corresponding to the above embodiment of the method for processing access to object storage applied to the user host, the present application also provides an embodiment of a method for processing access to object storage applied to a server-side. FIG. 8 shows a flow diagram of a method for processing access to object storage applied to a server-side provided by an embodiment of the present application, including the following steps specifically.

Step 802: in response to reception of a second data read request based on an access protocol of a block storage from a user host, determining a logical block address of data to be read according to the second data read request.

The second data read request is a request issued by the user host by, in response to reception of a first data read request, determining a data management unit corresponding to an object to be read by the first data read request according to a first mapping relationship, and determining a logical block address of the data management unit.

The first mapping relationship is a mapping relationship between first attribute information and second attribute information, the first attribute information is attribute information of an object in an object storage device, and the second attribute information is attribute information of a data management unit in a host system of the user host, where data of at least one data management unit is stored in a server-side cache, and the data of the at least one data management unit is data of a corresponding object.

Step 804: reading data of the logical block address from the server-side cache by using the logical block address.

Step 806: returning the data to the user host.

Because the server-side in the method, in response to reception of a second data read request based on an access protocol of a block storage from a user host, determines a logical block address of data to be read according to the second data read request. The second data read request is a request issued by the user host by, in response to reception of a first data read request, determining a data management unit corresponding to an object to be read by the first data read request according to a first mapping relationship, and determining a logical block address of the data management unit. The first mapping relationship is a mapping relationship between first attribute information and second attribute information, the first attribute information is attribute information of an object in an object storage device, and the second attribute information is attribute information of a data management unit in a host system of the user host, where data of at least one data management unit is stored in a server-side cache, and the data of the at least one data management unit is data of a corresponding object, so that mapping of object storage data to block storage is realized. Thus, in a case that the server-side can use the logical block address to read data of the logical block address from the server-side cache, it can return the data to the user host, time consumption caused by an access path with a distributed architecture of the object storage by a user is avoided, and conversion cost of a data access protocol of the object storage is avoided. Efficient access performance of the server-side cache and block storage protocol is exploited to accelerate access of the data of the object storage, and a feature that cost of the object storage is low and data access is convenient is combined to better meet access requirements.

In one or more embodiments of the present application, the server-side can also issue access to the object storage device to acquire more data of the object for being placed into the server-side cache, so as to meet the requirements of accelerating data access. Specifically, the method may also include: acquiring an object name and a data offset of each object in the object storage device in advance; establishing a second mapping relationship between the logical block address and the object name as well as the data offset according to the logical block address of the data management unit to which each object is mapped on the user host in advance; determining an object name and a data offset corresponding to the logical block address according to the logical block address and the second mapping relationship if the data of the logical block address does not exist in the server-side cache; issuing access to the object storage device by using the object name and the data offset to acquire the corresponding data; and placing the data into the server-side cache and returning the data to the user host.

According to the above embodiment, a lazy load time-loaded access mode is adopted, that is, in a case that the server-side determines that data to be read does not exist on the server-side, the server-side acquires data from the object storage device, returns the data to the user host, and places the data into the server-side cache for reuse, so as to avoid too much idle data from being placed into the cache and reduce resource waste.

In one or more embodiments of the present application, in order to accelerate access speed and avoid time consumption caused by the access in a case that no corresponding data is in the server-side cache, the block address cache information table is also set. Before the block address cache information table is used to access the server-side cache, it first determines whether the data is in the cache according to the block address cache information table. If yes, a user-side cache is accessed; if no, further access can be issued to the object storage device to acquire the corresponding data. Therefore, specifically, the embodiment, before the reading the data of the logical block address from the server-side cache by using the logical block address, also includes:

determining whether the data of the logical block address exists in the server-side cache according to a preset block address cache information table;

where the block address cache information table records a corresponding relationship between the logical block address and cache hit information, and the cache hit information is used to indicate whether data of a corresponding logical block address is located in the server-side cache.

In addition, each time the server-side acquires new data from the object storage device and updates the cache, it can update the address cache information table accordingly.

It should be noted that the above technical scheme of the method for processing access to object storage applied to the sever-side belongs to the same idea as the above technical scheme of the method for processing access to object storage applied to the user host. For details not described in the technical scheme of the method for processing access to object storage applied to the sever-side, see the description of the technical scheme of the method for processing access to object storage applied to the user host, and do not go into details here.

Figure 9:
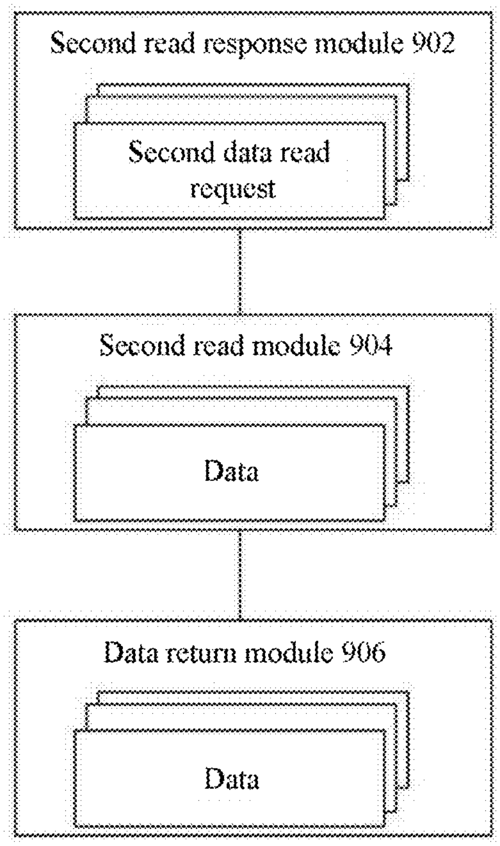
FIG. 9 is a structural diagram of an apparatus for processing access to object storage configured on a server-side provided by an embodiment of the present application.

Corresponding to the above method embodiment, the present application also provides an embodiment of an apparatus for processing access to object storage configured on a server-side. FIG. 9 shows a structural diagram of an apparatus for processing access to object storage configured on a server-side provided by an embodiment of the present application. As shown in FIG. 9, the apparatus includes:

a second read response module 902, which can be configured to, in response to reception of a second data read request based on an access protocol of a block storage from a user host, determine a logical block address of data to be read according to the second data read request;

where the second data read request is a request issued by the user host by, in response to reception of a first data read request, determining a data management unit corresponding to an object to be read by the first data read request according to a first mapping relationship, and determining a logical block address of the data management unit;

where the first mapping relationship is a mapping relationship between first attribute information and second attribute information, the first attribute information is attribute information of an object in an object storage device, and the second attribute information is attribute information of a data management unit in a host system of the user host, wherein data of at least one data management unit is stored in a server-side cache, and the data of the at least one data management unit is data of a corresponding object;

a second read module 904, which can be configured to read data of the logical block address from the server-side cache by using the logical block address; and a data return module 906, which can be configured to return the data to the user host.

Because the server-side in the apparatus, in response to reception of a second data read request based on an access protocol of a block storage from a user host, determines a logical block address of data to be read according to the second data read request. The second data read request is a request issued by the user host by, in response to reception of a first data read request, determining a data management unit corresponding to an object to be read by the first data read request according to a first mapping relationship, and determining a logical block address of the data management unit. The first mapping relationship is a mapping relationship between first attribute information and second attribute information, the first attribute information is attribute information of an object in an object storage device, and the second attribute information is attribute information of a data management unit in a host system of the user host, where data of at least one data management unit is stored in a server-side cache, and the data of the at least one data management unit is data of a corresponding object, so that mapping of object storage data to block storage is realized. Thus, in a case that the server-side can use the logical block address to read data of the logical block address from the server-side cache, it can return the data to the user host, time consumption caused by an access path with a distributed architecture of the object storage by a user is avoided, and conversion cost of a data access protocol of the object storage is avoided. Efficient access performance of the server-side cache and block storage protocol is exploited to accelerate access of the data of the object storage, and a feature that cost of the object storage is low and data access is convenient is combined to better meet access requirements.

In one or more embodiments of the present application, the apparatus can also include: an object information acquisition module, which can be configured to acquire an object name and a data offset of each object in the object storage device in advance; a second mapping module, which can be configured to establish a second mapping relationship between the logical block address and the object name as well as the data offset according to the logical block address of the data management unit to which each object is mapped on the user host in advance; an object address determination module, which can be configured to determine an object name and a data offset corresponding to the logical block address according to the logical block address and the second mapping relationship if the data of the logical block address does not exist in the server-side cache; an object access module, which can be configured to issue access to the object storage device by using the object name and the data offset to acquire the corresponding data; and a server-side cache update module, which can be configured to place the data into the server-side cache and return the data to the user host.

In one or more embodiments of the present application, the apparatus can also include: a server-side cache determination module, which can be configured to determine whether the data of the logical block address exists in the server-side cache according to a preset block address cache information table before the second read module 904 reads the data of the logical block address from the server-side cache by using the logical block address; where the block address cache information table records a corresponding relationship between the logical block address and cache hit information, and the cache hit information is used to indicate whether data of a corresponding logical block address is located in the server-side cache.

In one or more embodiments of the present application, the apparatus can also include: a cache information table update module, which can be configured to update the block address cache information table accordingly in a case that the server-side cache updates data.

The above is a schematic solution of an apparatus for processing access to object storage configured on a server-side of this embodiment. It should be noted that the technical scheme of the apparatus for processing access to object storage configured on a server-side belongs to the same idea as the above technical scheme of a method for processing access to object storage applied to a server-side. For details not described in the technical scheme of the apparatus for processing access to object storage configured on the server-side, see the description of the technical scheme of the method for processing access to object storage applied to the server-side.

Figure 10:
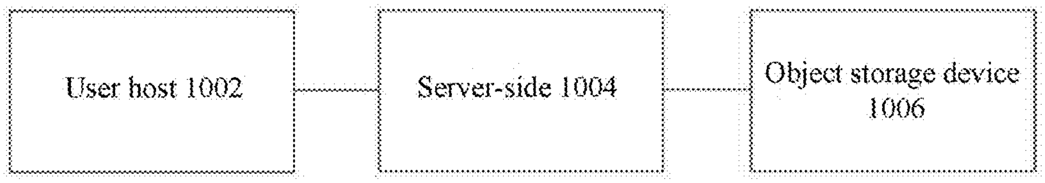
FIG. 10 is a structural diagram of a system for processing access to object storage provided by an embodiment of the present application.

Corresponding to the above method embodiment, the present application also provides an embodiment of a system for processing access to object storage. FIG. 10 shows a structural diagram of a system for processing access to object storage provided by an embodiment of the present application. As shown in FIG. 10, the system can include:

a user host 1002, which can be configured to establish a first mapping relationship between first attribute information and second attribute information in advance, wherein the first attribute information is attribute information of an object in an object storage device, and the second attribute information is attribute information of a data management unit in a host system of the user host, wherein data of at least one data management unit is stored in a server-side cache or stored in the server-side cache and a local cache of the user host, and the data of the at least one data management unit is data of a corresponding object; in response to reception of a first data read request, determine a data management unit corresponding to an object to be read by the first data read request according to the first mapping relationship; determine a logical block address of the data management unit; and access the server-side cache or the local cache of the user host to acquire data of the logical block address based on an access protocol of block storage and the logical block address;

a server-side 1004, which can be configured to, in response to reception of a second data read request based on an access protocol of a block storage from the user host, determine a logical block address of data to be read according to the second data read request, read data of the logical block address from the server-side cache by using the logical block address, return the data to the user host; acquire corresponding data from the object storage device if the data of the logical block address does not exist in the server-side cache; and an object storage device 1006, which can be configured to store data of an object.

The above system uses efficient data mapping to complete access to object on a local system, and actual data access is completed through lazy load object storage, which gives full play to the performance advantages of block storage and a local file system, and combines features that cost of the object storage is low and data access is convenient to better meet analysis requirements of the data lake.

The above is an illustrative scheme of a system for processing access to object storage of the present embodiment. It should be noted that a technical scheme of the system for processing access to object storage belongs to the same idea as a technical scheme of the above-mentioned method for processing access to object storage. For details not described in detail in the technical scheme of the system for processing access to object storage, reference may be made to the description of the technical scheme of the above-mentioned method for processing access to object storage.

Figure 11:
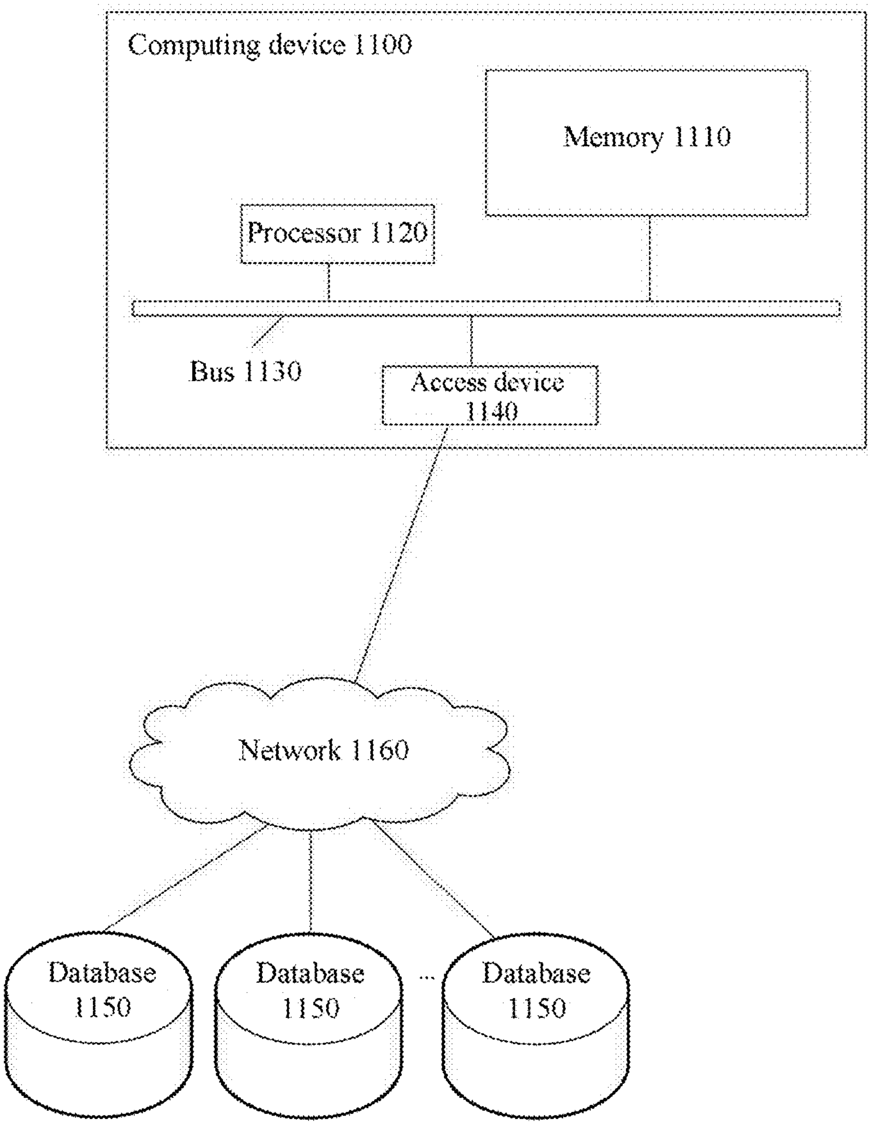
FIG. 11 is a structural block diagram of a computing device provided by an embodiment of the present application.

FIG. 11 shows a structural block diagram of a computing device 1100 provided according to an embodiment of the present application. Components of the computing device 1100 include but are not limited to a memory 1110 and a processor 1120. The processor 1120 is connected to the memory 1110 via bus 1130, and a database 1150 is configured to store data.

The computing device 1100 also includes an access device 1140 that enables the computing device 1100 to communicate over one or more networks 1160. Examples of these networks include a combination of communication networks of Public Switched Telephone Networks (PSTN), Local Area Networks (LAN), Wide Area Networks (WAN), Personal Area Networks (PAN), or such as the Internet. The access device 1140 may include one or more of any type of network interface (e.g., Network Interface Card (NIC)) of wired or wireless, such as IEEE802.11 Wireless Local Area Network (WLAN) wireless interface, Worldwide Interoperability for Microwave Access (Wi-MAX) interface, Ethernet interface, Universal Serial Bus (USB) interface, cellular network interface, Bluetooth interface, Near Field Communication (NFC) interface, and so on.

In an embodiment of the present application, the above components of the computing device 1100 and other components not shown in FIG. 11 may also be connected to each other, for example by a bus. It should be understood that the structural block diagram of the computing device shown in FIG. 11 is for example purposes only and is not a limitation of the scope of the present application. Persons skilled in the art may add or replace other parts as needed.

The computing device 1100 can be any type of stationary or mobile computing device, including mobile computers or mobile computing devices (e.g., tablets, personal digital assistants, laptop computers, notebook computer, netbooks, etc.), mobile phones (e.g., smartphones), wearable computing devices (e.g., smart watches, smart glasses, etc.) or other types of mobile devices, or stationary computing devices such as desktop computers or PCs. The computing device 1100 can also be a mobile or stationary server.

The processor 1120 is configured to execute the following computer-executable instruction, when the computer-executable instruction is executed by the processor, the steps of the above-mentioned method for processing access to object storage are implemented.

The above is an illustrative scheme of a computing device of the present embodiment. It should be noted that a technical scheme of the computing device belongs to the same idea as a technical scheme of the above-mentioned method for processing access to object storage. For details not described in detail in the technical scheme of the computing device, please refer to the description of the technical scheme of the above-mentioned method for processing access to object storage.

An embodiment of the present application further provides a computer-readable storage medium that stores computer-executable instructions, when the computer-executable instruction is executed by a processor, the steps of the above-mentioned method for processing access to object storage are implemented.

The above is an illustrative scheme of a computer readable storage medium of the present embodiment. It should be noted that a technical scheme of the storage medium belongs to the same idea as a technical scheme of the above-mentioned method for processing access to object storage. For details not described in detail in the technical scheme of the storage medium, reference may be made to the description of the technical scheme of the above-mentioned method for processing access to object storage.

An embodiment of the present application also provides a computer program, where a computer is caused to perform the steps of the above-mentioned method for processing access to object storage when the computer program is executed on the computer.

The above is an illustrative scheme of a computer program of the present embodiment. It should be noted that a technical scheme of the computer program belongs to the same idea as a technical scheme of the above-mentioned method for processing access to object storage. For details not described in detail in the technical scheme of the computer program, please refer to the description of the technical scheme of the above-mentioned method for processing access to object storage.

Specific embodiments of the present application are described above. Other embodiments are within the scope of the attached claims. In some cases, actions or steps described in the claim may be performed in a different sequence than in the embodiment and still achieve the desired result. In addition, the process described in the accompanying diagram does not necessarily require a specific sequence or sequential sequence to achieve the desired result. In some embodiments, multitasking and parallel processing are also possible or may be advantageous.

The computer instruction includes a computer program code, the computer program code can be source code form, object code form, executable file or some intermediate form. The computer readable medium may include: any entity or apparatus, recording medium, U drive, portable hard drive, magnetic disk, optical disc, computer memory, Read-Only Memory (ROM), Random Access Memory (RAM), electric carrier signal, telecommunication signal and software distribution medium, etc., which capable of carrying the computer program code. It should be noted that the contents of the computer readable medium may be appropriately increased or decreased according to the requirements of the legislation and patent practice in the jurisdiction, for example, in some jurisdictions, according to the legislation and patent practice, the computer readable medium does not include electric carrier signals and telecommunications signals.

It should be noted that, for the purpose of simple description, each of the above-mentioned embodiments of the method is expressed as a series of combinations of actions, but those skilled in the art should be aware that the embodiments of the present application are not limited by the sequence of actions described, because according to the embodiments of the present application, some steps may be performed in a different sequence or simultaneously. Secondly, persons skilled in the art should also be aware that the embodiments described in the present application are preferred embodiments, and that the actions and modules involved are not necessarily necessary for the embodiments of the present application.

In the above embodiments, the description of each embodiment has its own emphasis, and the part not detailed in one embodiment can be referred to the relevant description of other embodiments.

The above disclosed preferred embodiments of the present application are intended only to assist in the elaboration of the present application. The above-mentioned embodiments do not elaborate on all the details and do not limit the present disclosure to the specific embodiments described. Obviously, according to the contents of the embodiments of the present application, many modifications and changes can be made. These embodiments are selected and specifically described in the present application for the purpose of better explaining the principle and practical application of the embodiments of the present application, so that technicians in the technical field can better understand and use the present application. The present application is limited only by the claims and their full scope and equivalents.

The invention claimed is:

1. A method for processing access to object storage, applied to a user host, and comprising:

establishing a first mapping relationship between first attribute information and second attribute information in advance, wherein the first attribute information is attribute information of an object in an object storage device, and the second attribute information is attribute information of a data management unit in a host system of the user host, wherein data of at least one data management unit is stored in at least one of a cache of a server-side and a local cache of the user host, and the data of the at least one data management unit is data of a corresponding object;

in response to reception of a first data read request, determining a data management unit corresponding to an object to be read by the first data read request according to the first mapping relationship;

determining a logical block address of the data management unit; and accessing the cache of the server-side or the local cache of the user host to acquire data of the logical block address based on an access protocol of block storage and the logical block address;

wherein the server-side is configured to acquire an object name and a data offset of each object in the object storage device in advance; establish a second mapping relationship between the logical block address and the object name as well as the data offset according to the logical block address of the data management unit to which each object is mapped on the user host in advance; determine an object name and a data offset corresponding to the logical block address according to the logical block address and the second mapping relationship in a condition that the data of the logical block address does not exist in the cache of the server-side; issue access to the object storage device by using the object name and the data offset to acquire the corresponding data; and place the data into the cache of the server-side and returning the data to the user host.

2. The method according to claim 1, wherein the host system of the user host is a local file system, and the data management unit is a file, the establishing the first mapping relationship between the first attribute information and the second attribute information in advance, comprises:

mapping the attribute information of the object in the object storage device to attribute information of the file according to directory hierarchy to acquire a set of the first mapping relationship.

3. The method according to claim 1, wherein the accessing the cache of the server-side or the local cache of the user host to acquire the data of the logical block address based on the access protocol of the block storage and the logical block address, comprises:

accessing the local cache of the user host to acquire the data of the logical block address based on the access protocol of the block storage and the logical block address; and in a condition that the data of the logical block address is not acquired from the local cache of the user host, accessing the cache of the server-side to acquire the data of the logical block address based on the access protocol of the block storage and the logical block address.

4. The method according to claim 3, further comprising:

placing the data acquired from the cache of the server-side into the local cache of the user host.

5. The method according to claim 1, wherein the accessing the cache of the server-side or the local cache of the user host to acquire the data of the logical block address based on the access protocol of the block storage and the logical block address, comprises:

accessing the local cache of the user host to acquire the data of the logical block address based on the access protocol of the block storage and the logical block address;

wherein the method further comprises:

in a condition that the data of the logical block address is not acquired from the local cache of the user host, issuing access to the object storage device to acquire data of the object to be read by the first data read request; and placing the acquired data into the local cache of the user host.

6. A method for processing access to object storage, applied to a server-side, and comprising:

in response to reception of a second data read request based on an access protocol of a block storage from a user host, determining a logical block address of data to be read according to the second data read request;

wherein the second data read request is a request issued by the user host by, in response to reception of a first data read request, determining a data management unit corresponding to an object to be read by the first data read request according to a first mapping relationship, determining the logical block address of the data management unit, and determining that the data of the logical block address is not acquired from a local cache of the user host;

wherein the first mapping relationship is a mapping relationship between first attribute information and second attribute information, the first attribute information is attribute information of an object in an object storage device, and the second attribute information is attribute information of a data management unit in a host system of the user host, wherein data of at least one data management unit is stored in a cache of the server-side, and the data of the at least one data management unit is data of a corresponding object;

reading data of the logical block address from the cache of the server-side by using the logical block address; and returning the data to the user host;

acquiring an object name and a data offset of each object in the object storage device in advance;

establishing a second mapping relationship between the logical block address and the object name as well as the data offset according to the logical block address of the data management unit to which each object is mapped on the user host in advance;

determining an object name and a data offset corresponding to the logical block address according to the logical block address and the second mapping relationship in a condition that the data of the logical block address does not exist in the cache of the server-side;

issuing access to the object storage device by using the object name and the data offset to acquire the corresponding data; and placing the data into the cache of the server-side and returning the data to the user host.

7. The method according to claim 6, before the reading the data of the logical block address from the cache of the server-side by using the logical block address, further comprising:

determining whether the data of the logical block address exists in the cache of the server-side according to a preset block address cache information table;

wherein the block address cache information table records a corresponding relationship between the logical block address and cache hit information, and the cache hit information is used to indicate whether data of a corresponding logical block address is located in the cache of the server-side.

8. The method according to claim 7, further comprising:

updating the block address cache information table accordingly in a case that the cache of the server-side updates data.

9. A computing device, configured on a user host and comprising:

a memory and a processor;

wherein the memory is configured to store computer executable instructions, and the processor is configured to execute the computer executable instructions, the processor, when executing the computer executable instructions are executed by the processor, is configured to:

establish a first mapping relationship between first attribute information and second attribute information in advance, wherein the first attribute information is attribute information of an object in an object storage device, and the second attribute information is attribute information of a data management unit in a host system of the user host, wherein data of at least one data management unit is stored in at least one of a cache of a server-side and a local cache of the user host, and the data of the at least one data management unit is data of a corresponding object;

in response to reception of a first data read request, determine a data management unit corresponding to an object to be read by the first data read request according to the first mapping relationship;

determine a logical block address of the data management unit; and access the cache of the server-side or the local cache of the user host to acquire data of the logical block address based on an access protocol of block storage and the logical block address;

wherein the server-side is configured to acquire an object name and a data offset of each object in the object storage device in advance; establish a second mapping relationship between the logical block address and the object name as well as the data offset according to the logical block address of the data management unit to which each object is mapped on the user host in advance; determine an object name and a data offset corresponding to the logical block address according to the logical block address and the second mapping relationship in a condition that the data of the logical block address does not exist in the cache of the server-side; issue access to the object storage device by using the object name and the data offset to acquire the corresponding data; and place the data into the cache of the server-side and returning the data to the user host.

10. A non-transitory computer-readable storage medium, wherein the computer-readable memory medium stores computer executable instructions, when the computer executable instructions are executed by a processor, the steps of the method for processing access to the object storage according to claim 1 are implemented.

11. The computing device according to claim 9, wherein the host system of the user host is a local file system, and the data management unit is a file, the processor is configured to:

map the attribute information of the object in the object storage device to attribute information of the file according to directory hierarchy to acquire a set of the first mapping relationship.

12. The computing device according to claim 9, wherein the processor is configured to:

access the local cache of the user host to acquire the data of the logical block address based on the access protocol of the block storage and the logical block address; and in a condition that the data of the logical block address is not acquired from the local cache of the user host, access the cache of the server-side to acquire the data of the logical block address based on the access protocol of the block storage and the logical block address.

13. The computing device according to claim 12, wherein the processor is configured to:

place the data acquired from the cache of the server-side into the local cache of the user host.

14. The computing device according to claim 9, wherein the processor is configured to:

access the local cache of the user host to acquire the data of the logical block address based on the access protocol of the block storage and the logical block address;

in a condition that the data of the logical block address is not acquired from the local cache of the user host, issue access to the object storage device to acquire data of the object to be read by the first data read request; and place the acquired data into the local cache of the user host.

15. A computing device, configured on a server-side and comprising:

a memory and a processor;

wherein the memory is configured to store computer executable instructions, and the processor is configured to execute the computer executable instructions, when the computer executable instructions are executed by the processor, the steps of the method for processing access to the object storage according to claim 6 are implemented.

16. The computing device according to claim 15, wherein the processor is configured to:

acquire an object name and a data offset of each object in the object storage device in advance;

establish a second mapping relationship between the logical block address and the object name as well as the data offset according to the logical block address of the data management unit to which each object is mapped on the user host in advance;

determine an object name and a data offset corresponding to the logical block address according to the logical block address and the second mapping relationship in a condition that the data of the logical block address does not exist in the cache of the server-side;

issue access to the object storage device by using the object name and the data offset to acquire the corresponding data; and place the data into the cache of the server-side and returning the data to the user host.

17. The computing device according to claim 15, wherein, before reading the data of the logical block address from the cache of the server-side by using the logical block address, the processor is configured to:

determine whether the data of the logical block address exists in the cache of the server-side according to a preset block address cache information table;

wherein the block address cache information table records a corresponding relationship between the logical block address and cache hit information, and the cache hit information is used to indicate whether data of a corresponding logical block address is located in the cache of the server-side.

18. The computing device according to claim 17, wherein the processor is configured to:

update the block address cache information table accordingly in a case that the cache of the server-side updates data.

19. A non-transitory computer-readable storage medium, wherein the computer-readable memory medium stores computer executable instructions, when the computer executable instructions are executed by a processor, the steps of the method for processing access to the object storage according to claim 6 are implemented.

* * * * *